(12) United States Patent
Miyaoh

(10) Patent No.: US 6,705,619 B2
(45) Date of Patent: Mar. 16, 2004

(54) CYLINDER HEAD GASKET WITH PERIPHERAL BEAD

(75) Inventor: Yoshio Miyaoh, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 10/199,048

(22) Filed: Jul. 22, 2002

(65) Prior Publication Data

US 2003/0015845 A1 Jan. 23, 2003

(30) Foreign Application Priority Data

Jul. 23, 2001 (JP) ........................................ 2001-221710

(51) Int. Cl.⁷ ................................................. F02F 11/00
(52) U.S. Cl. ....................................................... 277/594
(58) Field of Search ................................ 277/590, 591, 277/593, 594

(56) References Cited

U.S. PATENT DOCUMENTS

| | | | | |
|---|---|---|---|---|
| 4,721,315 A | * | 1/1988 | Ueta | 277/593 |
| 5,879,012 A | * | 3/1999 | Udagawa | 277/595 |
| 5,906,376 A | * | 5/1999 | Udagawa et al. | 277/595 |
| 5,924,700 A | * | 7/1999 | Kobayashi | 277/595 |
| 5,951,021 A | * | 9/1999 | Ueta | 277/593 |
| 6,089,572 A | * | 7/2000 | Plunkett | 277/592 |
| 6,139,025 A | * | 10/2000 | Miyaoh | 277/593 |
| 6,250,644 B1 | * | 6/2001 | Diez et al. | 277/595 |
| 6,406,032 B1 | * | 6/2002 | Miyaoh | 277/594 |
| 6,422,573 B1 | * | 7/2002 | Sekioka | 277/594 |
| 6,499,743 B2 | * | 12/2002 | Sadowski | 277/593 |
| 6,550,782 B2 | * | 4/2003 | Okazaki et al. | |
| 2001/0017446 A1 | * | 8/2001 | Jinno | 277/594 |
| 2001/0040347 A1 | * | 11/2001 | Unseld et al. | 277/593 |
| 2002/0140179 A1 | * | 10/2002 | Sadowski | 277/593 |

\* cited by examiner

*Primary Examiner*—William L. Miller
(74) *Attorney, Agent, or Firm*—Kanesaka & Takeuchi

(57) ABSTRACT

A cylinder head gasket is formed of a metal plate, a sealing bead formed in the metal plate around a liquid hole, and a peripheral bead formed in the metal plate to extend around a periphery of the metal plate. At least a part of the peripheral bead is set to have a surface pressure lower than that of the sealing bead when the gasket is tightened by that the height of the peripheral bead is lower than that of the sealing bead or the width of the peripheral bead is greater than that of the sealing bead. Thus, when the gasket is tightened, substantially uniform and optimum load share can be obtained on the peripheral bead and the sealing bead for the fluid hole.

7 Claims, 2 Drawing Sheets

CYLINDER HEAD GASKET WITH PERIPHERAL BEAD

BACKGROUND OF THE INVENTION AND RELATED ART STATEMENT

The invention relates to a cylinder head gasket wherein a surface pressure on a peripheral bead and a surface pressure on a sealing bead for a water or oil hole can be optimized.

A cylinder head gasket formed of a single metal plate or a plurality of metal plates includes a peripheral bead at a position corresponding to a periphery of a cylinder head or head block of a cylinder. The peripheral bead suppresses bending of a periphery of the head block when the head block of the cylinder is tightened against a cylinder block. Or, the peripheral bead suppresses looseness of tightened bolts, and further, is provided to secondarily seal a fluid hole, such as a water hole and an oil hole, which is provided with an independent sealing bead therearound.

However, in the request for light weight of the engine, in case a peripheral bead is formed to have the same height and width as those of the sealing bead disposed around the fluid hole, when the head block is tightened against the cylinder block by the bolts with a suitable tightening force, a bending may occur on the periphery of the head block.

In view of the above problem, the present invention has been made and an object of the invention is to provide a cylinder head gasket, wherein when the head block is tightened by bolts against the cylinder block, substantially uniform and optimum load can be obtained on a peripheral bead of the cylinder head gasket.

Another object of the invention is to provide a cylinder head gasket, wherein the surface pressures of a sealing bead for a fluid hole and a peripheral bead can be optimized.

Further objects and advantages of the invention will be apparent from the following description of the invention.

SUMMARY OF THE INVENTION

In order to attain the above objects, a cylinder head gasket according to the present invention is structured such that a height of a peripheral bead disposed on a metal plate constituting the gasket is entirely or partially made lower than that of a sealing bead for a fluid hole.

According to a preferable embodiment of the present invention, the height of the peripheral bead in a portion where the peripheral bead is made low, is in a range of one third to two thirds relative to the height of the sealing bead for the fluid hole.

Also, in the cylinder head gasket according to the present invention, a width of the peripheral bead formed on a metal plate constituting the gasket can be entirely or partially made wider than that of the sealing bead for the fluid hole.

In the cylinder head gasket having the structure as described above, when the gasket is manufactured, the height of the peripheral bead is formed lower than that of the liquid hole sealing bead, preferably, the height is set to about half of the height of the sealing bead for the fluid hole, or the width of the peripheral bead is entirely or partially formed wider than that of the sealing bead for the fluid hole. When tightened by the bolts, both beads are compressed to a specific height between the cylinder block and the cylinder head, or both beads are compressed under the state where the cylinder head is bent within a tolerance, so that the optimum load share can be obtained at the time of compression of the sealing bead for the fluid hole and the peripheral bead. Also, substantially uniform or appropriate surface pressure can be obtained at the peripheral bead.

DETAILED DESCRIPTION OF THE PREFERRED EMBODIMENTS

Figure 1:
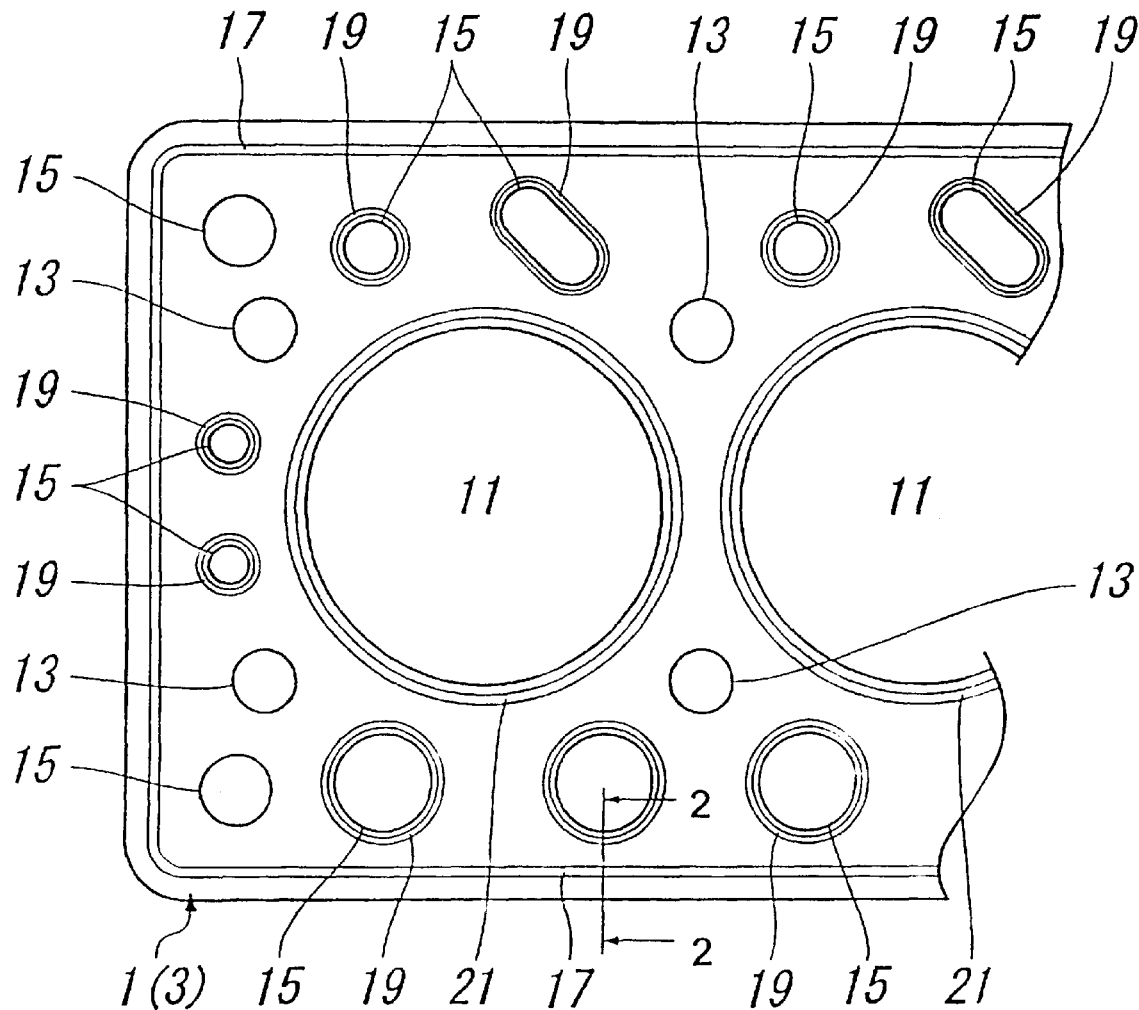
FIG. 1 is a partially cut plan view of a first embodiment of a cylinder head gasket according to the present invention.
Figure 2:
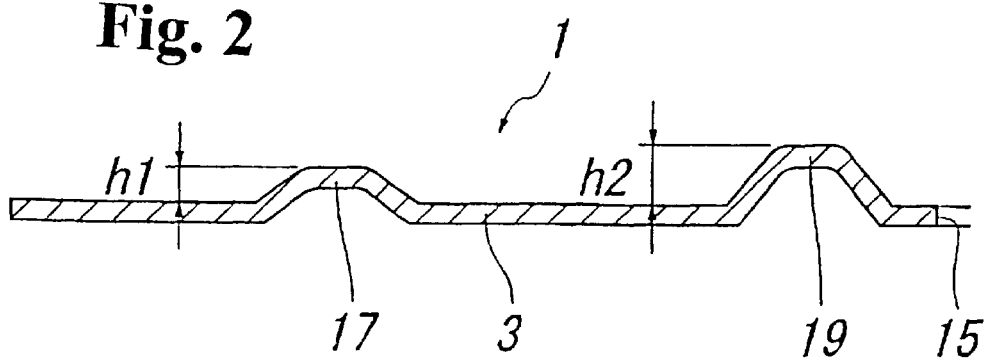
FIG. 2 is a sectional view taken along line 2—2 in FIG. 1.
Figure 3:
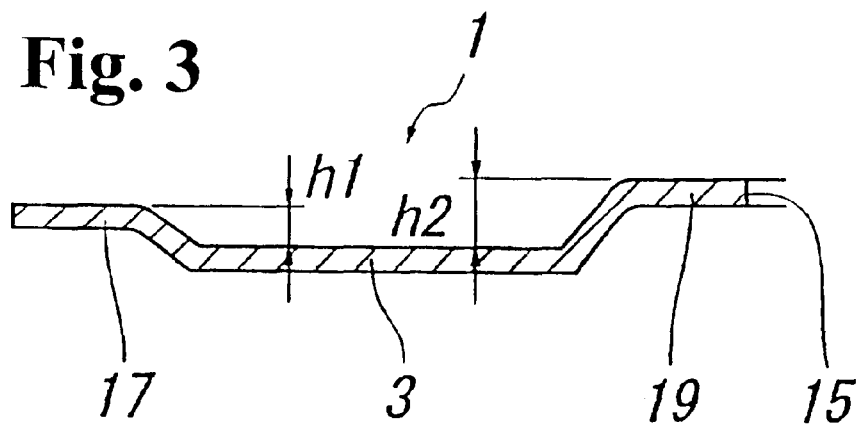
FIG. 3 is a sectional view, similar to FIG. 2, of a second embodiment of the invention.
Figure 4:
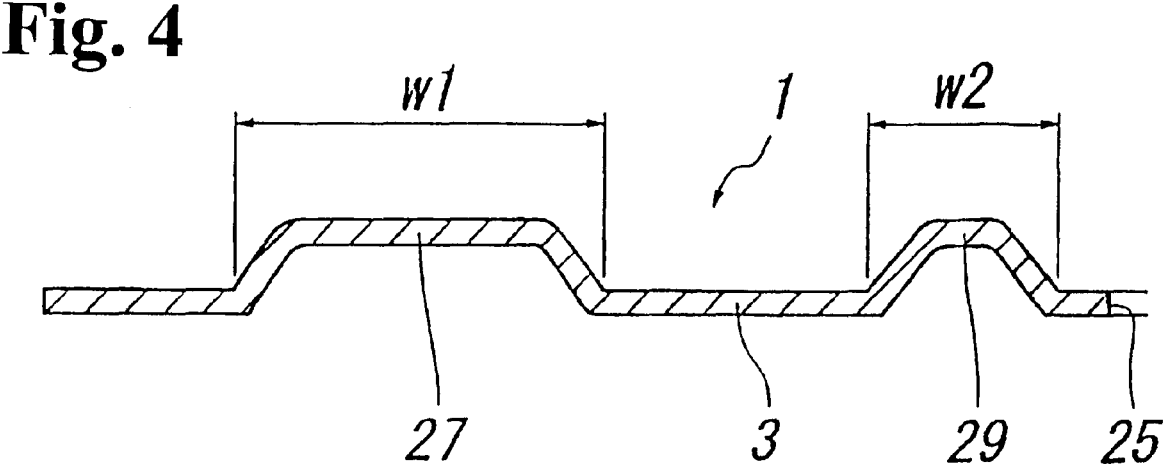
FIG. 4 is a sectional view, similar to FIG. 2, of a third embodiment of the invention.

Next, with reference to the accompanying drawings, embodiments of the present invention will be explained in detail. FIGS. 1 and 2 show a first embodiment of a cylinder head gasket according to the present invention; FIG. 3 is a sectional view showing a second embodiment thereof; and FIG. 4 is a sectional view showing a third embodiment thereof.

As shown in FIGS. 1 and 2, a cylinder head gasket 1 is formed of a single metal plate 3 and installed between a cylinder head and a cylinder block (both not shown). In the gasket 1, there are provided combustion chamber holes 11 corresponding to combustion chambers of the cylinder block, required number of bolt holes 13 for tightening by bolts, and required number of fluid holes 15, such as water holes and oil holes.

The metal plate 3 is provided with a peripheral bead 17 in a shape of full bead at a position corresponding to the periphery of a cylinder head or block, and independent sealing beads 19 in a shape of full bead around the respective fluid holes 15, such as water and oil holes. The peripheral bead 17 is effective for suppressing the bending in the periphery of the head block, suppressing looseness of the bolts for tightening the cylinder head against the cylinder block, or secondary sealing of the fluid holes 15.

As clearly shown in FIG. 2, the height h1 of the peripheral bead 17 is set to about half of the height of the sealing bead 19 for the fluid hole 15, so that the optimum load share can be obtained in the compression condition of the sealing bead 19 for the fluid hole 15 and the peripheral bead 17. Also, substantially uniform or optimum surface pressure can be obtained at the peripheral bead 17. Incidentally, the height h1 of the peripheral bead 17 can be set to a height of one third to two thirds of the height h2 of the sealing bead 19 for the water and oil holes. More preferably, it is experimentally effective that the height h1 of the peripheral bead 17 is set in a range from two fifths to three fifths of the height h2 of the sealing bead 19.

In the above-stated first embodiment, although the peripheral bead 17 and the sealing bead 19 are constituted by the full bead, respectively, the shape of the beads is not limited thereto, and the peripheral bead 17 and the sealing bead 19 may be constituted by half beads as in a second embodiment shown in FIG. 3. The surface pressure of the peripheral bead 17 when tightened can be lowered by lowering the height h1 of the peripheral bead 17 than the height h2 of the sealing bead 19. Thus, the beads 17, 19 operate as in the first embodiment.

The surface pressure can also be lowered by widening a bead width w1 of a peripheral bead 27 formed of a full bead. Namely, the peripheral bead 27 is made wider than a bead width w2 of a sealing bead 29 for a fluid hole 25 by 1.5 to 2 times, as in a third embodiment shown in FIG. 4.

In other words, when the bolt is tightened, the beads are inevitably compressed to a specific height between the cylinder head and cylinder block. Thus, as the original height of the bead 17 is low as shown in FIG. 3, and as the original width of the bead 27 is wide as shown in FIG. 4, the surface pressures at the beads become smaller.

Incidentally, in case the height or the width of the peripheral bead 17, 27 is partially made lower or wider:, it is effective that the portion is kept at least 50% of the complete bead.

In the cylinder head gasket 1 having the structure as described above, when the gasket is manufactured, the height h1 of the peripheral bead 17 is made lower than the height h2 of the sealing bead 19 for the fluid hole 15, preferably, the height h1 is set to about half of the height h2 of the sealing bead 19 for the fluid hole 15, or the width w1 of the peripheral bead 27 is entirely or partially made wider than the width w2 of the sealing bead 29 for the fluid hole 25. When the gasket is tightened with the bolts, both beads are compressed to a specific height between the cylinder block and the cylinder head, or compressed under the state where the bending of the cylinder head occurs within a tolerance, so that the optimum load share for the compressing quantity for the sealing beads 19, 29 of the fluid holes 15, 25 and the compressing quantity for the peripheral beads 17, 27 can be obtained. Also, substantially uniform or appropriate surface pressures can be obtained at the peripheral beads 17, 27.

Incidentally, in the present invention, the gasket 1 is not limited to the gasket formed of the single metal plate 3, and can also be applied to the gasket formed by laminating plural metal plates. In that case, the peripheral bead 17 and the sealing bead 19 for the water or oil hole are not necessarily disposed on the same plate.

Also, it is preferable that a sealing bead 21 for the combustion chamber hole 11 is provided separately from the sealing bead 19 for the fluid hole 15 and peripheral bead 17. In other words, the load shares of the sealing bead 21 for the combustion chamber hole 11, the sealing bead 19 for the fluid hole 15 and the peripheral bead 17, when compressed, are set to be optimum, and the load shares of the sealing bead 19 for the fluid hole 15 and the peripheral bead 17 are set according to the above described condition.

According to the cylinder head gasket of the invention as described above, when the gasket is manufactured, the height of the peripheral bead is formed lower than that of the fluid hole sealing bead. Preferably, the peripheral bead is set to half of the height of the fluid hole sealing bead, or the width of the peripheral bead is entirely or partially formed wider than that of the fluid hole sealing bead. Then, when both beads are tightened by the bolts between the cylinder head and the cylinder block, the two beads are compressed to a specific height, or the two beads are compressed under the state that the cylinder head is bent within a tolerance, so that the optimum load shares can be obtained when the sealing bead of the fluid hole and the peripheral bead are compressed. Also, substantially uniform or optimum surface pressure can be obtained on the peripheral bead.

While the invention has been explained with reference to the specific embodiments of the invention, the explanation is illustrative and the invention is limited only by the appended claims.

What is claimed is:

1. A cylinder head gasket, comprising:

a metal plate for constituting the gasket having a first hole for a cylinder bore, at least one second hole for at least one liquid hole, a plurality of bolt holes, and an outer periphery thereof, a sealing bead formed in the metal plate around the at least one second hole, and having a first height and a first width, and a peripheral bead formed in the metal plate to extend along the outer periphery of the metal plate to completely surround the first hole, the at least one second hole and the plurality of bolt holes, said peripheral bead having a second height and a second width, at least a part of the peripheral bead being set to have a surface pressure lower than that of the sealing bead when the gasket is tightened by a structure such that the second height is lower than the first height or the second width is greater than the first width.

2. A cylinder head gasket according to claim 1, wherein said second height is ⅓–⅔ of the first height.

3. A cylinder head gasket according to claim 1, wherein said second width is 1.5–2 times of the first width.

4. A cylinder head gasket according to claim 1, wherein said sealing bead and the peripheral bead are full beads, each having a flat top portion.

5. A cylinder head gasket according to claim 1, wherein said sealing bead and the peripheral bead are half beads.

6. A cylinder head gasket according to claim 1, wherein said peripheral bead has the surface pressure lower than that of the sealing bead in its entirety when the gasket is tightened.

7. A cylinder head gasket according to claim 6, wherein said metal plate has a rectangular shape, said peripheral bead being formed immediately inside the outer periphery of the metal plate to have a rectangular shape.

* * * * *